United States Patent [19]
Clarke

[11] Patent Number: 5,840,198
[45] Date of Patent: Nov. 24, 1998

[54] SEPARATION APPARATUS AND METHOD

[75] Inventor: Neville Clarke, Berwick, Australia

[73] Assignee: International Fluid Separation Pty Ltd, Australia

[21] Appl. No.: 776,368

[22] PCT Filed: Jul. 28, 1995

[86] PCT No.: PCT/AU95/00460

§ 371 Date: Jan. 29, 1997

§ 102(e) Date: Jan. 29, 1997

[87] PCT Pub. No.: WO96/04058

PCT Pub. Date: Feb. 15, 1996

[30] Foreign Application Priority Data

Jul. 29, 1994 [AU] Australia .................. PM7147

[51] Int. Cl.$^6$ .................................................. C02F 1/40
[52] U.S. Cl. ..................... 210/802; 210/519; 210/522; 210/540; 210/521
[58] Field of Search ................... 210/519, 521, 210/522, 538, 540, 802, 804

[56] References Cited

U.S. PATENT DOCUMENTS

| | | | |
|---|---|---|---|
| 653,012 | 7/1900 | Koyl | 210/521 |
| 1,458,805 | 6/1923 | Christensen | 210/862 |
| 2,570,304 | 10/1951 | Bach | 210/522 |
| 2,793,186 | 5/1957 | Dunell et al. | 210/521 |
| 3,797,203 | 3/1974 | Murdock, Sr. | 210/521 |
| 4,045,344 | 8/1977 | Yokota | 210/521 |
| 4,514,303 | 4/1985 | Moore | 210/521 |
| 4,678,588 | 7/1987 | Shortt | 210/788 |
| 4,722,800 | 2/1988 | Aymong | 210/802 |
| 4,816,146 | 3/1989 | Schertler | 210/522 |
| 4,921,609 | 5/1990 | Fromson | 210/521 |
| 4,988,441 | 1/1991 | Moir | 210/522 |
| 5,286,383 | 2/1994 | Verret et al. | 210/540 |
| 5,505,860 | 4/1996 | Sager | 210/519 |

FOREIGN PATENT DOCUMENTS

| | | |
|---|---|---|
| 0 024 148 | 2/1981 | European Pat. Off. . |
| 0 202 071 | 11/1986 | European Pat. Off. . |
| 0 462 852 | 12/1991 | European Pat. Off. . |
| 117538 | 8/1899 | Germany . |
| 7515028 | 6/1977 | Netherlands . |
| 1136823 | 1/1985 | U.S.S.R. . |
| 435615 | 9/1935 | United Kingdom . |
| 2 116 447 | 9/1983 | United Kingdom . |
| 2 249 502 | 5/1992 | United Kingdom . |
| WO 92/17260 | 10/1992 | WIPO . |

*Primary Examiner*—Christopher Upton
*Attorney, Agent, or Firm*—Michael Best & Friedrich LLP

[57] ABSTRACT

A separation apparatus, particularly for separating two fluids having different densities or specific gravities, is described. The apparatus is provided with a baffle arrangement (22) located within cylindrical housing (3) comprising a plurality of conical-shaped baffles having sloping wall surfaces (24). The conical baffles may be arranged in a nested or stacked relationship or may be connected together to form a continuous helix. A convection current is set up within the apparatus such that one part of the flow is through the baffles in the direction from the base of the conical baffles to the centrally located aperture and the other part of the flow is along the interior walls of the apparatus in a gap between the peripheral edge of the base of the conical baffles and the interior wall. The material to be separated is discharged from the apparatus through a high level outlet acting as an overflow weir.

29 Claims, 10 Drawing Sheets

SEPARATION APPARATUS AND METHOD

BACKGROUND OF THE INVENTION

The present invention relates to a method and apparatus for separating two different materials, particularly two different fluids, and more particularly to a method and apparatus for separating two at least partially immiscible liquids having different densities or specific gravities. Even more particularly, the present invention relates to a method and apparatus for separating an organic material, such as for example an oil or other oleophilic material, and water mixture prior to discharging the water component to a drainage or waste disposal system, such as for example a drainage or sewerage system of a community, town or city. The present invention finds particular application in separating engine oil and other petroleum products and hydrocarbons, particularly those used in the automotive industry from water, such as wash water, run-off water and rain water. Other applications in the sewage and waste water disposal industries are also anticipated as also are applications in the off-shore oil industry. The method and apparatus may also be useful in separating solid particles from fluids.

It is to be noted that the present invention may find application in separating any two dissimilar fluids, particularly liquids, provided that the separation can be achieved under the influence of gravity. The present invention may also find application in a wide variety of industries and with a diverse range of products.

Although the present invention will be described with particular reference to one particular form of the oil and water separator in one particular application it is to be noted that the scope of the present invention is not restricted to the described embodiments and uses but rather the scope of the present invention is more extensive so as to include other arrangements of the separating apparatus and use of these embodiments and arrangements in other applications than those specifically described, including other methods.

One problem encountered with service stations and other establishments servicing automobiles is that engine oil and other hydrocarbon products used in the automotive industry are spilt onto or otherwise deposited on the floor and other surfaces, such as driveways or service station forecourts, upon which the vehicles are being serviced, driven or parked. During periodic cleaning of these surfaces, and when the forecourt of the service station is being hosed down, or in times of high rainfall producing water run-off, water containing oil contaminants or other petroleum product contaminants flow into the storm water drainage system or other waste outlets. With increasing concerns about the environment, more stringent requirements concerning the disposal of waste products (whether voluntary or legal) are coming into force. Thus, there is a growing need to provide a method of removing contaminants from water prior to disposing of the water into the drainage system. Accordingly, the presence of an oil and water separator is particularly desirable in service stations or other establishments where there is a high risk of contamination by oil based products of the water entering the normal drainage or sewerage system.

One disadvantage of known separators or traps is that they have been difficult to clean and maintain. Some are inefficient and require a large amount of space. In times of high rainfall, some separators, traps or sumps overflow so that any accumulated oil is flushed into the drainage system. Therefore there is a need for a separator which is easy to clean and maintain.

In some existing separating devices, large volumes of water are retained along with the oil being trapped or separated. Because the cost of removal and transportation is dependent on the volume being transported, the cost of disposal of the oil together with excessive amounts of retained water is unnecessarily increased in accordance with the amount of unwanted water present with the oil.

Therefore, there is a need to provide a method and apparatus of separating oil from water which is suitable for use in small business establishments such as service stations, which method and apparatus can be easily maintained so that the apparatus remains substantially serviceable. Additionally, there is a need to provide a suitable separator or separation system which is low in cost, easily maintained, and efficient so that the cost of removing and transporting any recovered oil can be reduced.

Therefore, it is the object of the present invention to overcome or substantially ameliorate the above disadvantages by providing a method or apparatus which results in enhanced separational efficiency of two dissimilar fluids. Additionally, it is an aim of the present invention to provide a separator which is compact in size, which is cheap to build and install, easily maintained and cleaned, and which is more efficient than existing separators, and to provide methods of using such separators.

SUMMARY OF THE INVENTION

According to one aspect of the present invention there is provided a separation apparatus for substantially separating at least two at least partially immiscible materials having different densities or specific gravities from each other, said apparatus comprising inlet means for admitting a mixture of the at least two at least partially immiscible materials, separating means for at least partially separating the mixture into at least a first fraction and a second fraction, and at least two outlet means, one of said outlet means for discharging the first fraction and a second of the outlet means for discharging the second fraction wherein the separating means comprises a baffle arrangement for inducing separation of the at least two materials, said baffle arrangement defining a flow path along which the mixture to be separated flows, said flow path being arranged such that the mixture flowing along the flow path resides in the flow path for a time sufficient to at least partially separate the mixture into the two fractions thereby separating the mixture into the at least two fractions, said baffle arrangement being provided with a first surface spaced apart from a second surface for inducing separation of the at least two materials.

According to another aspect of the present invention there is provided a method of substantially separating a mixture of at least two at least partially immiscible materials into at least a first fraction and a second fraction comprising the steps of admitting a mixture containing both fluids to a separator means through an inlet means, allowing the mixture to flow along a flow path defined by a baffle arrangement provided in the separator means such that the mixture resides in the separator means for a time sufficient to at least partially separate the mixture into a first fraction and a second fraction, said baffle arrangement being provided with a first surface spaced apart from a second surface, said surfaces for inducing separation of the two materials such that the inducing surface of the baffle arrangement leads to or is directed to an outlet means for one of the fractions, and discharging the first fraction through a first outlet means and discharging the second fraction through a second outlet means thereby separating the mixture into two fractions.

Typically, the two materials are both liquids. More typically one liquid is hydrophilic and the other is hydrophobic. Even more typically, one liquid is an oil or oil based product and the other is water.

Typically, the baffle arrangement is substantially or generally helical or spiral in shape. More typically, the baffle arrangement defines a more or less continuously helical flow path for the oil/water mixture being separated. More typically, the baffle arrangement is made up of a plurality of individual baffle plates connected together in a continuous helix or stacked in spaced apart relationship.

Typically, the baffle plates are each of a frusto-conical shape. More typically, the baffle plates have a centrally located aperture located at or towards the tapered end or apex of the cone. More preferably, the conical baffle plates in normal use are oriented with the open central portion or apex directed upwards. However, the central open portion may be located oriented downwards, i.e. below the level of the base of the conical baffle.

Typically, the individual baffle plates are located in spaced apart relationship, more typically, in regular spaced apart relationship. More typically, the baffle plates are separate from each other and are nested such that the tapered central portions or apex having the aperture is located uppermost and the base of the cone is located lowermost while the baffles are spaced apart from each other.

It is to be noted that the baffles and flow through the baffles is such that the convection current set-up is such that the direction of flow is in the direction from the base of the baffle to the apex of the baffle irrespective of the orientation of the baffles.

Typically, the conical side surface of the baffle plate is smooth and continuous. However, this surface can be provided with apertures, ports, cut-outs or similar. Additionally, the surface may be provided with surface irregularities or riffles, such as projections, ribs, ridges, indentations, cavities or other aids to separating one or more of the at least two fluids.

Typically, the baffle plates may be provided with a flange, skirt or similar located at, towards or around the base of the conical plate. The flange may be continuous or be provided with cut-outs. The flange may be located at any angle to the body of the baffle, typically from about 45° to 135°.

One typical example of the baffle plate is provided with a surface which is substantially wavy, undulating, corrugated or sinusoidal having a plurality of troughs and crests located more or less regularly spaced apart around the circumference extending radially outwardly from the centre to the periphery.

Typically, in use there is a gap between the outer circumferential edge of the baffle plate or flange if provided and the inner surface of the separator wall to allow separated oil to raise in the gap under the inference of gravity. Typically, the interior of the wall of the separator is provided with deflectors, baffles or the like. More typically, the deflectors are associated with but spaced apart from the baffles.

Typically, at least one of the outlet means is an overflow weir. More typically, the outlet for the lighter or lightest of the fractions being separated is located at a level above the level that the heavy or heavier of the fractions is discharged, particularly, where the outlet branches into two outlet conduits, one being for returning the heavy or heavier fraction to waste and the other for recycling this fraction.

Typically, the mixture to be separated is admitted to the separator at a location corresponding to the end of the separator to which the base of the conical baffles are directed so that the flow is through the baffles in a direction towards their apex.

Typically, the outlets form a manometer or substantially U-shaped trap between them in which the light or lighter fraction outlet is located above the level of discharge of the heavy or heavier fraction, particularly the junction between the two outlets or conduits discharging the heavy or heavier fractions.

Typically, air or other gas is admitted to the interior of the separator body using a sparging system to assist in separating the oil and water. In this embodiment a flexible sparge pipe is located at or towards the central axis to admit the air or gas mixture towards the base of the separator to assist in initiating and maintaining a convection current.

In a preferred embodiment the baffle is radially symmetrical.

The geometries and shape of the disclosed devices, particularly the baffles and interior of the separator, promote the separation of substances of different densities and physical attributes.

BRIEF DESCRIPTION OF THE DRAWINGS

The present invention will now be described by way of example with reference to the accompanying drawings in which.

DESCRIPTION OF THE PREFERRED EMBODIMENTS

Figure 1:
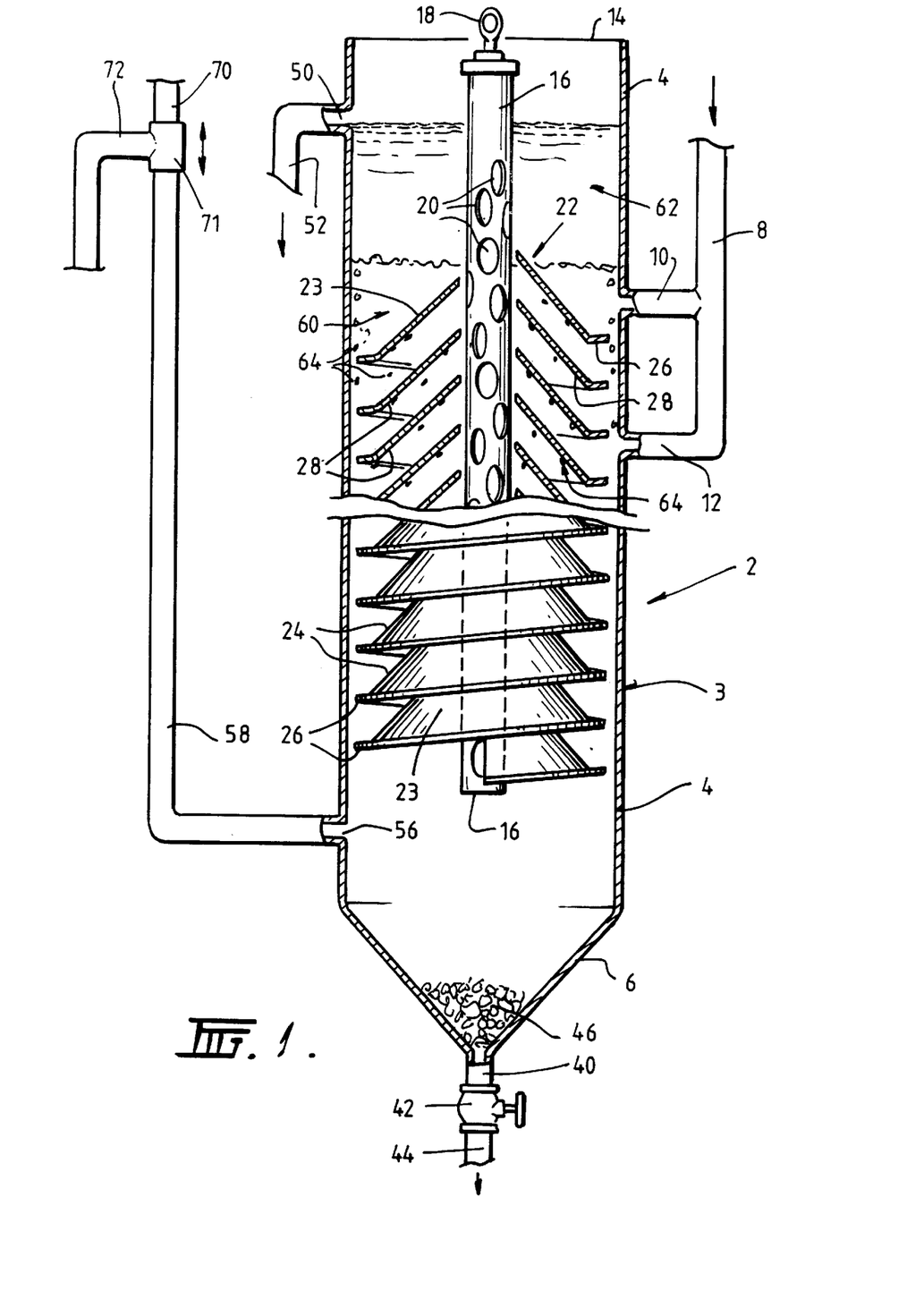
FIG. 1 is a partial vertical cross sectional view of one embodiment of the separator in accordance with the present invention.

In FIG. 1 there is shown one form of oil and water separator. The device requires no power input other than gravity and sufficient hydrostatic head and is therefore thought of as passive. The separator 2 is provided with a substantially cylindrical body 3 having a side wall 4. The body 3 terminates in a conical base 6, which is tapered downwardly. The apex of the conical base collects solids 46. A lateral inlet in the form of a conduit or pipe 8 receives an oil/water mixture to be separated. It may be made from any practical material such as for example a solvent resistant plastic, PVC or the like.

Conduit 8 preferably branches into two inlets 10, 12 spaced vertically apart from one another. The first inlet pipe 10 is located in sidewall 4 relatively closer to the top 14 of the separator 2. The second inlet pipe 12 is located at a lower level than inlet 10. This arrangement is known to produce more efficient separation, perhaps because some separation of the oil and water occurs in conduit 8 so that relatively more of the lighter oil is admitted through inlet pipe 10 than through inlet pipe 12. It is to be noted that it is not essential for the operation of the separator 2 that the inlet 8 be branched into two inlets 10, 12.

A cylindrical or other shaped tube 16 is located along the central longitudinal axis of the separator 2. It may be suspended and removed by a hook 18 which extends above the top 14 of separator 2. The central tube 16 may be provided with a plurality of relatively large sized apertures 20 for admitting fluid through the wall of tube 16. However, the presence of apertures 20 is optional in some embodiments, as is the presence of tube 16 in still other embodiments. Tube 16 extends from about the top 14 of separator 2 to extend to close to the bottom of the cylindrical portion of separator 2 above the level of water outlet 58. Apertures 20 are provided at spaced apart locations over almost the entire length of tube 16. As well as being vertically spaced apart the apertures 20 are circumferentially or radially spaced apart around the circumference or tube 16. The tube 16 may be open at the upper and lower ends. Tube 16 is an optional feature and may be dispensed with in some embodiments.

A baffle 22 is arranged along and circumferentially around the outer surface of tube 16. A repeating sub-component of a helical baffle or any separate member of a stack of individual baffle members will be referred to as a "unit" or "baffle unit". The term "baffle" may also refer to a baffle unit, a collection of units or a continuous helix or similar. One form of baffle 22 is a substantially continuous helix arrangement. A continuous helix baffle may be extruded from PVC or another suitable polymer. Oleophilic polymers are preferred. Different applications of the invention will require the baffle to be made from different materials which are compatible with the liquids being separated. The baffle arrangement 22 may in some embodiments also comprise a series of individual spaced apart baffles, stacked or nested one above the other while maintaining the separation. Each unit of the baffle arrangement 22 is preferably provided with a sloping wall surface 24. Where the walls of the baffle arrangement 22 are sloped, they slope from the central axis down toward the cylindrical wall 4 in some embodiments. However, in other embodiments the baffles may slop upwards.

A peripheral flange portion 26 (whether continuous or discontinuous) may be provided on each unit or along the outside edge of the helix formed from the baffles. In one embodiment the baffle arrangement 22 comprises a plurality of identical units, for example, conical baffle plates arranged in a nested relationship extending from towards the top of tube 16 to the bottom of tube 16. This arrangement is similar in appearance to the baffle arrangement 22 depicted in FIG. 1 except that individual baffles are stacked and nested rather than having a substantially continuous helical form. In a preferred embodiment the wall surface 24 of each baffle convolution 23 is inclined at 45°–55° from the horizontal. There is a gap between the maximum outside diameter of the baffle and the inside of the side wall 4. There may also be a gap between the inside diameter of the baffle and the tube 16, or tube 16 may be deleted. The baffle is provided with a flange portion arranged at any angle to the sloping wall, typically, from about 45° to 135°. The flange may be folded upon itself to form a reverse curve with the sloping wall.

A drain conduit 40 is provided at the extreme bottom surface of frusto-conical lower portion 6. A valve arrangement in the form of a tap 42 is provided in the drain outlet 40. A drain pipe 44 is connected to valve 42. Heavy liquids and solids 46 collect in the lower portion or apex of the conical section 6 and are removed through the drain 44 by periodically opening the valve 42.

A first outlet 50 is provided in the upper portion of the wall 4 for discharging oil or the lighter fluid. The outlet 50 is provided with a discharge conduit 52. The outlet 50 is preferably located circumferentially opposite from and above the positions of the inlets 10 and 12. A second outlet 56 is provided in the lower portion of wall 4 near to where tapered portion 6 commences. The second outlet 56 is provided with a discharge conduit 58 which in turn branches into two further conduits 70, 72 at junction 71. The position of junction 71 may be adjustable so as to alter its height relative to the height of the separator and of oil outlet 50. Further it is to be noted that separator 2 and conduit 58 form a substantially U-shaped trap. For efficient operation of the separator 2 the height of outlet 50 should be above the level of junction 71. Outlet 56 is primarily for discharging separated water to the drainage system or for recycling water back through the separator 2 to remove any residual amounts of oil.

It is to be noted that the baffle arrangement can take any suitable form, shape, orientation, length or size and may be made from any suitable material. One such modification is that the baffle may be circular, square, oval, elliptical, or any other shape, including any polygonal shape. Additionally, the baffle may be of any size from quite small for being suitable for domestic installations to quite large for commercial or industrial establishments.

In operation, water contaminated with oil such as the wash water from an automotive repair or service establishment is collected in a suitable sump, drain, pit, reservoir or the like. The water contaminated with oil is pumped or otherwise admitted to the inlet 8 by any suitable means. As the inlet 8 divides into upper inlet 10 and lower inlet 12 and inlet 10 is vertically spaced above or at a higher level than inlet 12, a fraction richer in oil is believed to be admitted to separator 2 through inlet 10. Any free oil located inside separator 2 rises to form a layer of oil 62 towards the top of separator 2.

While the precise mechanism by which enhanced separation occurs is not fully understood, it is believed that the oil and water mixture may be swirled or otherwise imparted with circular or helical motion by passing around and through the baffle 22. Droplets of oil 64 may cling to the underneath or inner sloping surfaces 28 of the baffle. The droplets of oil travel along the inner surface 28 of each individual baffle 23 and flow through apertures 20 to or near or within the central opening or through tube 16 if present or through the openings in the baffles themselves where they rise to the surface of liquid 60 to add to the layer 62 of oil.

In addition a convection current may be operating which flows up along the central axis or through the plurality of in-line apertures of the baffles in the vicinity of the tube 16 or if tube 16 is not present along the central axis of the separator and down along the cylindrical wall 4. Further, the longitudinal baffle creates one or more regions of varying velocity through which individual suspended oil particles pass. Because of turbulent regions or acceleration fields, the oil particles are thought to eventually pass into a zone where the forces acting on the particle are optimum for causing aggregation of the oil particles to form a drop or droplet. Any and all of these mechanisms may be at work.

If required the separated water may be recycled either through the sump for collecting more oil or back to the separator for further separation. Separated oil from layer 62 rises to overflow outlet 50 and flows through conduit 52 to be collected in a suitable receptacle for safe disposal or for recycling.

Figure 2:
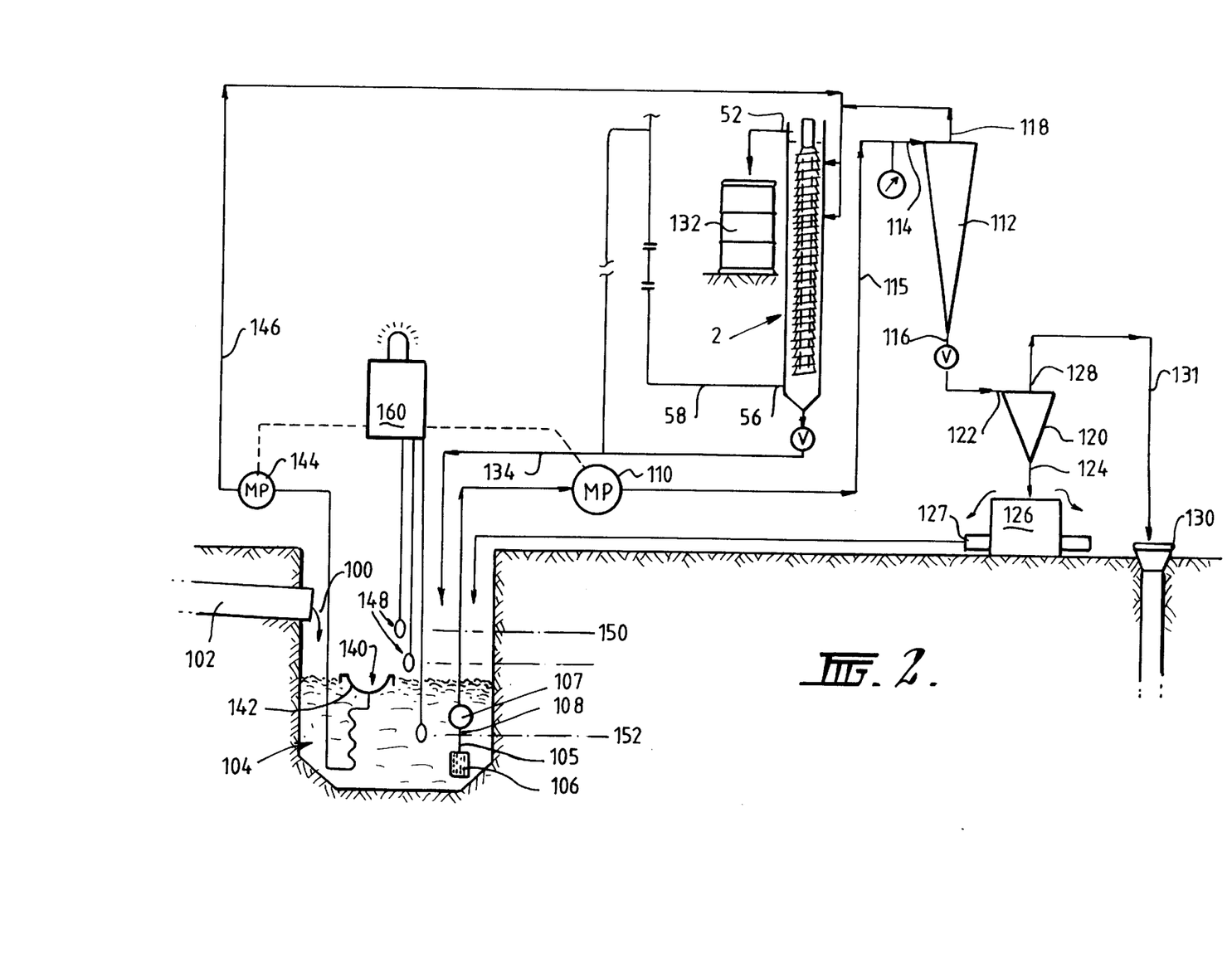
FIG. 2 is a schematic view of one form of a flow chart showing the various components used in a method of separation in accordance with the present invention as adapted for use on land in a small scale operation.

In some instances one or more stages of hydrocyclone separation may precede the passive separator 2. In other situations hydrocyclone separation may be used after the passive device 2. In yet other applications, no hydrocyclone is required. FIG. 2 illustrates one instance where both hydrocyclone technology and passive separator technology are used to separate oil and water from a pit. The passive device is used primarily to remove oil extracted from the surface of the liquid by a skimmer 140, 142 in the pit 104 and treat the waste which is rejected from the primary hydrocyclone 112. As shown in FIG. 2, an oil/water mixture 100 is drained through a drain pipe 102 and collected in a reservoir, pit, sump, or trap 104 which is provided with a conduit 108 for pumping the mixture 100 via a pump (such as a MONOPUMP brand pump) 110 to a liquid/liquid hydrocyclone 112. The conduit 108 is provided with a submerged intake 105 having a strainer 106 and standing valve 107. The primary hydrocyclone 112 is provided with an inlet 114 located at or towards the top of the hydrocyclone 112 for admitting the mixture 100 via the conduit 115. A first outlet 116 located at the base of hydrocyclone discharges water substantially free from lighter fractions. A second outlet 118 located towards the top of the hydrocyclone discharges either oil or an oil/water mixture.

Water containing solids discharged from the hydrocyclone outlet 116 may be admitted to a liquid/solid hydrocyclone 120 via inlet 122. There, solids are separated from water and discharged through the outlet 124 for collection in a drum 126. The water is discharged through the outlet 128 for removal and transfer to the drainage system 130 via conduit 131 for subsequent removal. Any excess water discharged through the outlet 124 is returned to the sump 104 by overflowing the drum 126 into the drain 127.

The oil/water mixture discharged from outlet 118 of hydrocyclone 112 is fed to separator 2 where the oil is removed from the water as described previously. The oil discharged through the outlet conduit 52 is fed to an oil storage drum 132 for subsequent safe disposal or recycling. Water, substantially free of oil or nearly so, is discharged through outlet 56 and outlet conduit 58 for return to sump 104 through return conduit 134.

Within the sump 104, the oil/water mixture is removed from the surface of the sump by a skimmer inlet 140 which comprises a skimmer 142, a pump 144 and a conduit 146. This surface oil is fed to the inlet of the separator 2.

Operation of the various pumps so as to regulate the depth of the sump (and consequently the operation of the hydrocyclones) is by means of depth sensors 148, which detect high 150 and lower levels 152 of the sump 104 and active or de-activate the pumps 110, 144 with a control system 160. In one embodiment the pump 144 may be incorporated as a submersible pump and be an integral unit of the skimmer unit 142.

Figure 3:
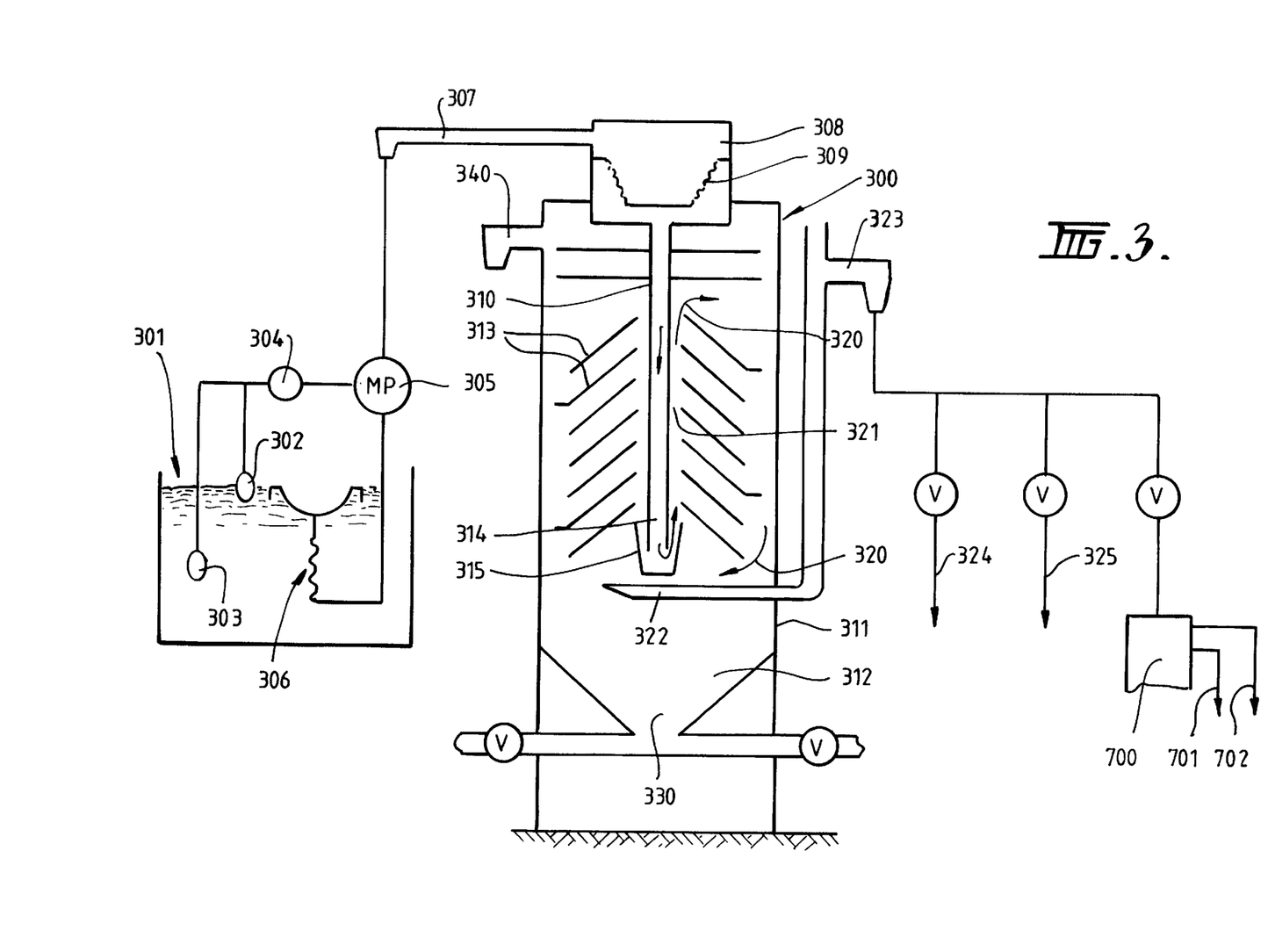
FIG. 3 is another schematic flow chart illustrating a separator and method of employing it.

Another passive separation apparatus is depicted in FIG. 3. This apparatus comprises a passive separator 300 and a level regulated sump 301. The regulated sump 301 further comprises a high level sensor 302, a low level sensor 303 and a timer 304 which acting together regulate a motorised pump 305. The pump 305 draws through a skimming apparatus 306 and delivers to an inlet 307 of the separator 300. The inlet 307 empties into a vessel 308 which serves as a flow dampener and siphon breaker. The vessel 308 also contains a strainer or filter 309 for removing debris. A vertical conduit 310 extends along the central longitudinal axis of a cylindrical housing 311. The housing 311 terminates in a tapered or conical portion 312 which serves as a trap for heavy liquids and solids as previously described with reference to the device depicted in FIG. 1.

The vertical conduit 310 is surrounded by a baffle 313, a particularly advantageous embodiment of which will be described with reference to FIGS. 4–6. The bottom 314 of the conduit 310 is open and discharges into a direction reversing cup 315. The side walls of the cup 315 preferably open to a taper of about 8° for the purpose of optimising the efficiency of the change in flow direction. It will be appreciated that upon entering the cup 315 the discharge of the conduit 310 reverses and is directed upwardly. It is suspected that this change in flow direction coupled with the difference in specific gravity between the oil and the water creates a convection current 320 within the enclosure 311. This convection current is suspected of rising in the gap 321 which exists between the inside diameter of the baffle 313 and the conduit 310, the convection current descending in the space between the outside diameter of the baffle and the inner wall of the enclosure 311.

In operation, separated water enters a collector 322 which is located just below the cup 315. The water is discharged through an outlet 323 and may be diverted to further recycling 324 or to waste 325. In one particularly advantageous embodiment, the water from the outlet 323 is introduced into a second passive separator 400. The oil discharge 401 and water discharge 402 of this second separator 400 may be treated just as are the discharges of the first separator 300. In practice the efficiency of this type of serial passive separation appears to be in excess of that which would otherwise be expected.

It is suspected that debris such as solid particulate matter may accumulate on the baffle 313. For maintenance purposes, the baffle may be agitated, such as by rotating, twisting or imparting vibration into it. This agitation will cause the particulate build-up to fall downward and be collected in the apex 330 of the conical portion 312. It is preferred that this agitation occur when water is being discharged for recycling 324 as opposed to when water is being discharged to waste 325.

In a preferred embodiment, the diameter of the baffle 313 is approximately 300 millimeters. The baffle pitch or spacing is about 20 mm. The angle formed by the baffle units is approximately 45°–55° from the horizontal. In this preferred embodiment, the inside diameter of the baffle is approximately 80 millimeters. Within this 80 millimeter central opening in the baffle there is located a 25 millimeter central conduit 310. Both the direction reversing cup 315 and the separated water discharge 322 are approximately 50 millimeters in diameter.

It will also be appreciated that separated oil is discharged from the oil outlet 340 which is preferably located above the level of the highest point in the separated water discharge 323.

A preferred embodiment of a baffle is illustrated with reference to FIGS. 4, 5 and 6. It should be appreciated that this baffle structure may be utilised in any of a variety of passive separation vessels, for example of the descending intake type as depicted in FIG. 3 or the lateral intake type as depicted in FIG. 1. As previously mentioned, a baffle of the type denoted by 313 is a device whose structure repeats along a longitudinal axis. The baffle 313 may be in the form of a continuous helix or a series of stacked, individual discs or truncated cones.

Figures 4, 5, 6:
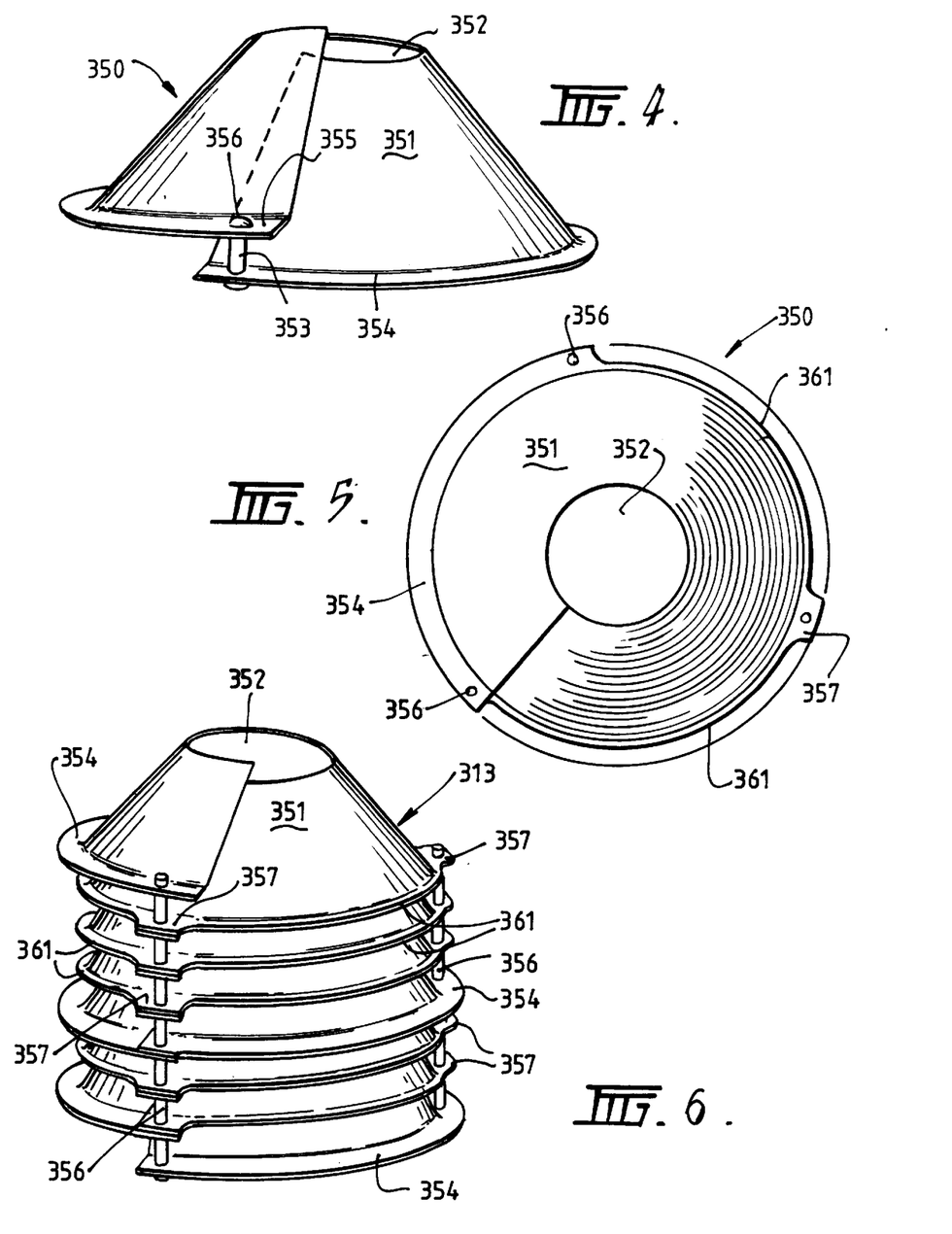
FIG. 4 is a side elevation view of one form of a baffle.
FIG. 5 is a top plan view of the baffle of FIG. 4.
FIG. 6 is a side perspective view of a series of individual baffles.
Figure 7A:
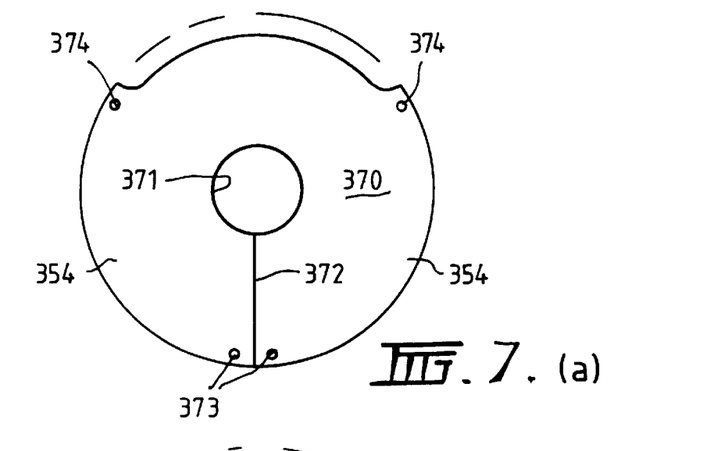
FIGS. 7(a)–(f) illustrate top plan views of baffle unit precursors.
Figure 7B:
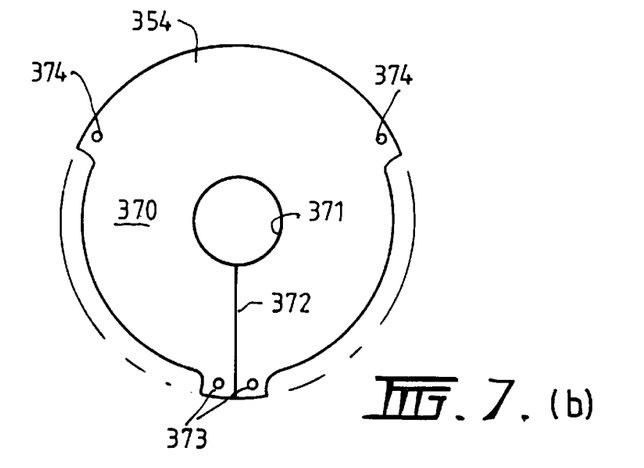
Figure 7C:
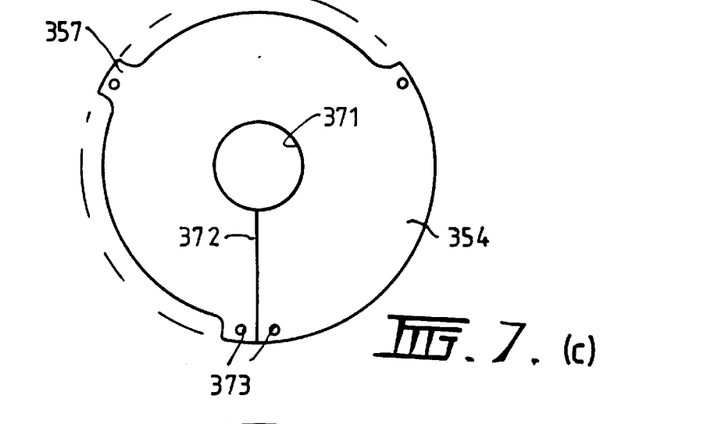
Figure 7D:
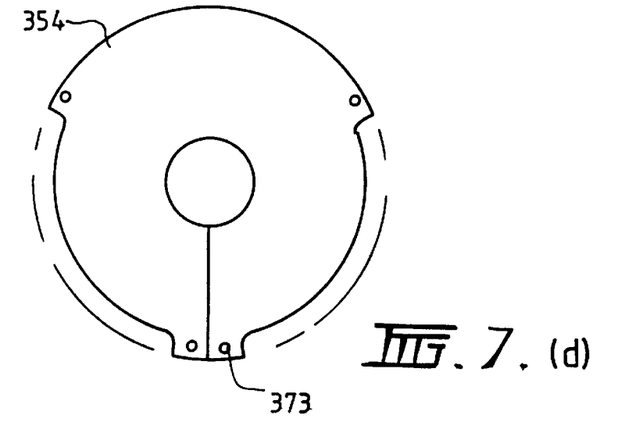
Figure 7E:
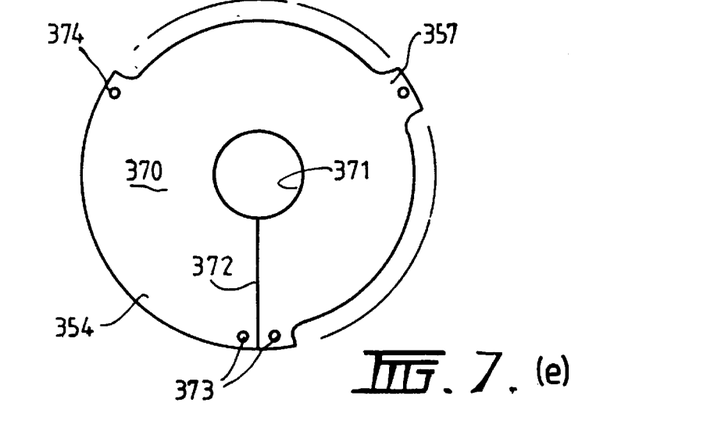
Figure 7F:
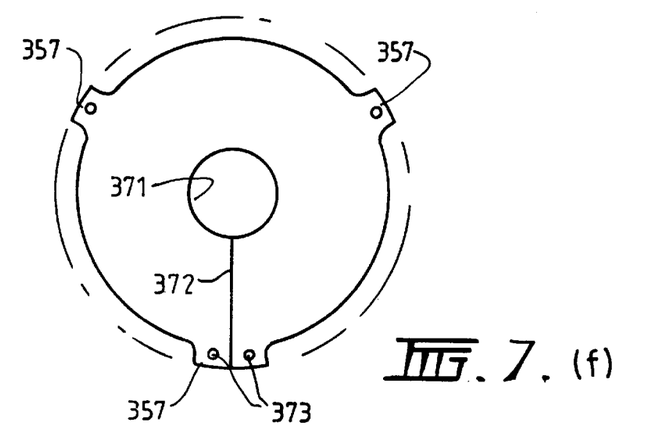

One unit 350 of a helical baffle 313 is depicted in FIG. 4. In this example, the unit 350 has a maximum diameter of about 30 millimeters. The unit 350 is characterised by side walls 351 which are approximately 45°–55° inclined with respect to the horizontal. The upper extremity of the unit 350 forms a more or less circular opening 352. In this example, the pitch of the unit 350 is about 20 mm and is determined by a spacer 353 which is interposed between one portion of the peripheral flange 354 and an overlapping portion of this same flange 355. In practice, a baffle 313 may be fabricated (as shown in FIG. 6) from units 350 (as depicted in FIG. 4) by stacking the units along one or more (preferably 3) vertical rods 356. The vertical rods 356 pass either through the peripheral flange 354 or protruding tabs 357. In the alternative, a helical baffle may be formed from a continuous strip. In this alternative embodiment, there is a circular opening provided in each turn of the baffle forming the helix.

It has been found that the effectiveness of the baffle structure may be enhanced with the provision of certain arcuate relief portions in the peripheral flange 354. As shown in FIGS. 4–6, at least certain portions of the peripheral flange 354 diverge from the 45°–55° cone angle toward the horizontal. For example, as shown in FIG. 5, one unit's flange located between two of the three vertical posts 356 has been removed or relieved 361. A tab 357 is left between the two relief portions 361. As evident from an examination of FIG. 6, the location of the relieved and unrelieved flange portions is alternated. In the particular example depicted in FIG. 6, a repeating pattern has been established. Looking between two of the three vertical posts 356 it is seen that a flange portion 354 is present only on every fourth unit. If the baffle 313 were to be thought of comprising 120° sectors defined by the location of the vertical posts 356, it will be understood that the vertical displacement of the flanges 354 is staggered when adjacent 120° sectors are compared. This is evidenced by comparing the left and right hand sides of the baffle depicted in FIG. 6.

In one preferred embodiment of a passive separator, 34 helical units have been assembled in the fashion depicted in FIG. 6. However, any number of units may be employed.

A means of fabricating two types of baffle units is depicted in FIGS. 7 (*a*) to (*f*). As shown in these Figures, the precursor for a helical baffle unit may comprise a flat, round disc 370 which has been formed with a central opening 371, a radial slit 372 and four peripheral through holes 373, 374. The holes 373 located on either side of the slit 372 will eventually lie above and below the spacer 353.

In some embodiments, it may be preferable to include an entirely surrounding circumferential flange 354 on each unit of the baffle, whether it be helical or otherwise. In other instances, it may be preferable to provide periodic interruption of the flange as depicted in FIG. 6. As shown in FIG. 6, any 120° sector of the baffle 313 includes a flange 354 on only one of each four successive units. This arrangement may be referred to as a "long step", the term "step" referring to the vertical distance between flange portions 354. This arrangement may be fabricated by forming units from four different flat discs as depicted in FIGS. 7(*c*)–(*f*). In the four different units depicted in FIGS. 7(*c*)–(*f*) it will be observed that with respect to unit (c) the flange has been left only on that 120° segment which is anti-clockwise from the radial slit 372. With reference to units (d) and (e) it can be seen that the flange 354 has been provided on each of the other two 120° segments. With regard to the unit depicted in FIG. 7(*f*) each of the approximately 120° segments has been relieved to essentially remove the peripheral flange 354 but for the tab 357. If the units (c)–(f) are assembled as previously suggested, in sequence, the structure of FIG. 6 will be produced.

Figure 14:
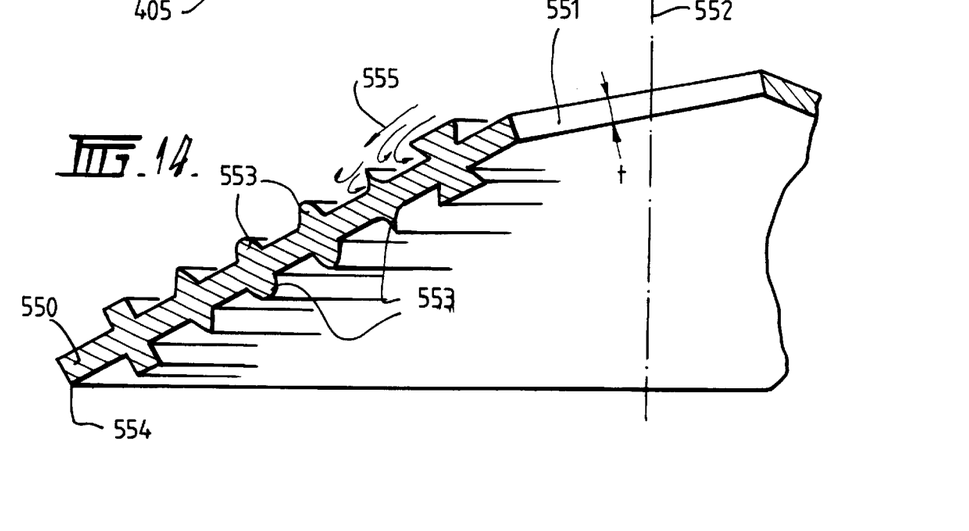
FIG. 14 is a schematic cross section illustrating a variety of riffle types (shown larger than life) formed on a baffle.

In the alternative, a shorter "step" may be provided. This is done by utilising the unit precursors depicted in FIGS. 7(*a*) and (*b*) in alternating fashion as previously suggested. This will result in the production of a baffle having a peripheral flange step every two units rather than every four units as depicted in FIG. 6. In some instances, the performance of a baffle may be enhanced by providing it with riffles. In this context, a riffle is an impediment in a flow path which is affixed to a surface of a baffle. The purpose of the impediment is to generate a small turbulent region, the friction losses of which are acceptable when compared to the beneficial aggregation or coalescence which occurs in each region. As shown in FIG. 14, a baffle or baffle unit 550 is formed around a central opening 551 and central vertical longitudinal axis 552. Riffles 553 are shown as abnormally large in relation to the baffle thickness "t" in order to demonstrate that the riffles 553 may be of a variety of shapes an sizes.

The exaggeration of the riffle size also helps illustrate that the riffles are generally parallel to the circumferential edge 554 of a baffle or baffle unit, so as to lie perpendicular to the radial component 555 of flow near the baffle, whether toward or away from the central axis 552. It should be apparent that while square, triangular, semi-circular and parabolic riffles have been depicted in FIG. 14, it is unlikely that more than one variety would be used on any one baffle, although riffles of different sizes might be used in regions of different velocities. Further it is to be noted that the riffles may line along the direction of movement of the oil droplets.

The "step", the dimensions of the baffles and the gap between the baffles and the vessel wall, and the presence or absence of openings in the baffles, riffles on the baffles and flange configuration are all factors which may contribute to a device where a variety of geometric in the flow path create a variety of acceleration, velocity and turbulence regions within a single device. As previously mentioned, this variety of conditions means that an individual oil particle or droplet will eventually encounter a region which favours its aggregation, with other particles, into a larger globule. This fact accounts fo the variety of geometric both within the scope and spirit of the invention and within any one particular device suggested or taught by this disclosure.

It should be understood that the horizontal divergence of the flange 354 from the nominal cone angle (as shown in FIG. 4) may be formed into the otherwise flat precursor discs after the initial cutting but sometime before final assembly. Units may be vacuum formed.

Figure 8:
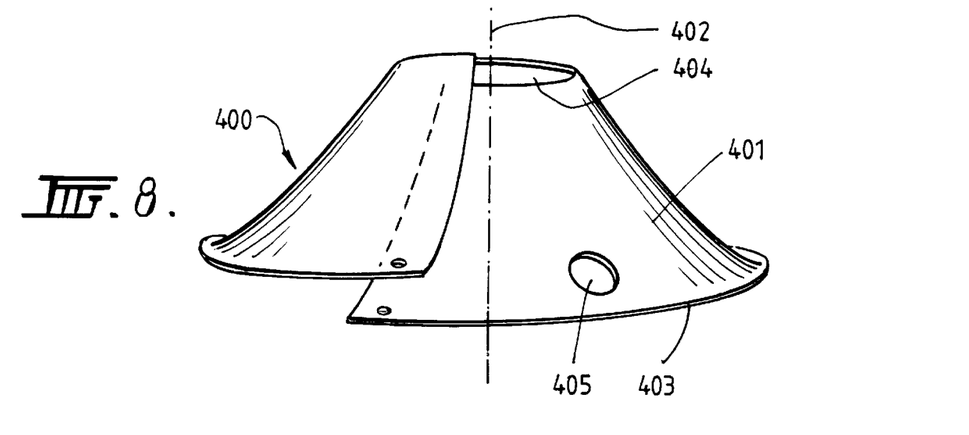
FIG. 8 is a perspective view of an alternate baffle unit.

FIG. 8 illustrates an alternate baffle "unit" 400. Unlike the unit 350 depicted in FIG. 4, this unit 400 has a curved wall 401. At the outer edge 403 the curvature approaches perpendicularity with the longitudinal axis 402. At the inner edge 404 the curvature approaches parallelity with a longitudinal axis 402. The severity of the curve and the exact geometrical particulars will depend on the particular application. In addition, FIG. 8 illustrates that any particular baffle or baffle unit may be provided with one or more through openings 405. In practice, it is preferred that the openings 405 not be located one above the other. In this sense the openings 405 are preferably staggered either radially, or circumferentially, or both.

Figure 9:
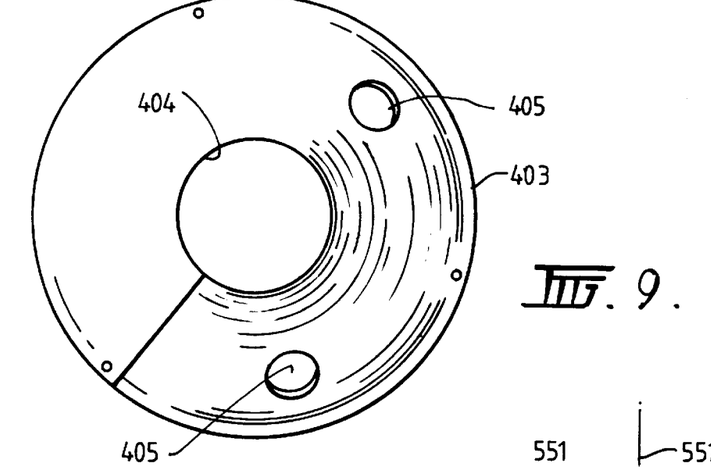
FIG. 9 is a plan view of the baffle of FIG. 8.

FIG. 9 illustrates another embodiment of a precursor for one form of the baffle unit. It is different from the precursors depicted in FIG. 7 owing to the through openings 405. Note that the one or more openings 405 are located near the outside edge 403. In this sense, they may be used as alternates to or adjuncts to the peripheral flange 354 as shown in FIG. 4 and FIG. 6. In essence, they serve the same purpose as the flanges 354 in that they create opportunities for oil particles to rise and regions of favourable turbulence or velocity which regions favour the aggregation or coalescence of oil particles in globules.

Figures 10, 11:
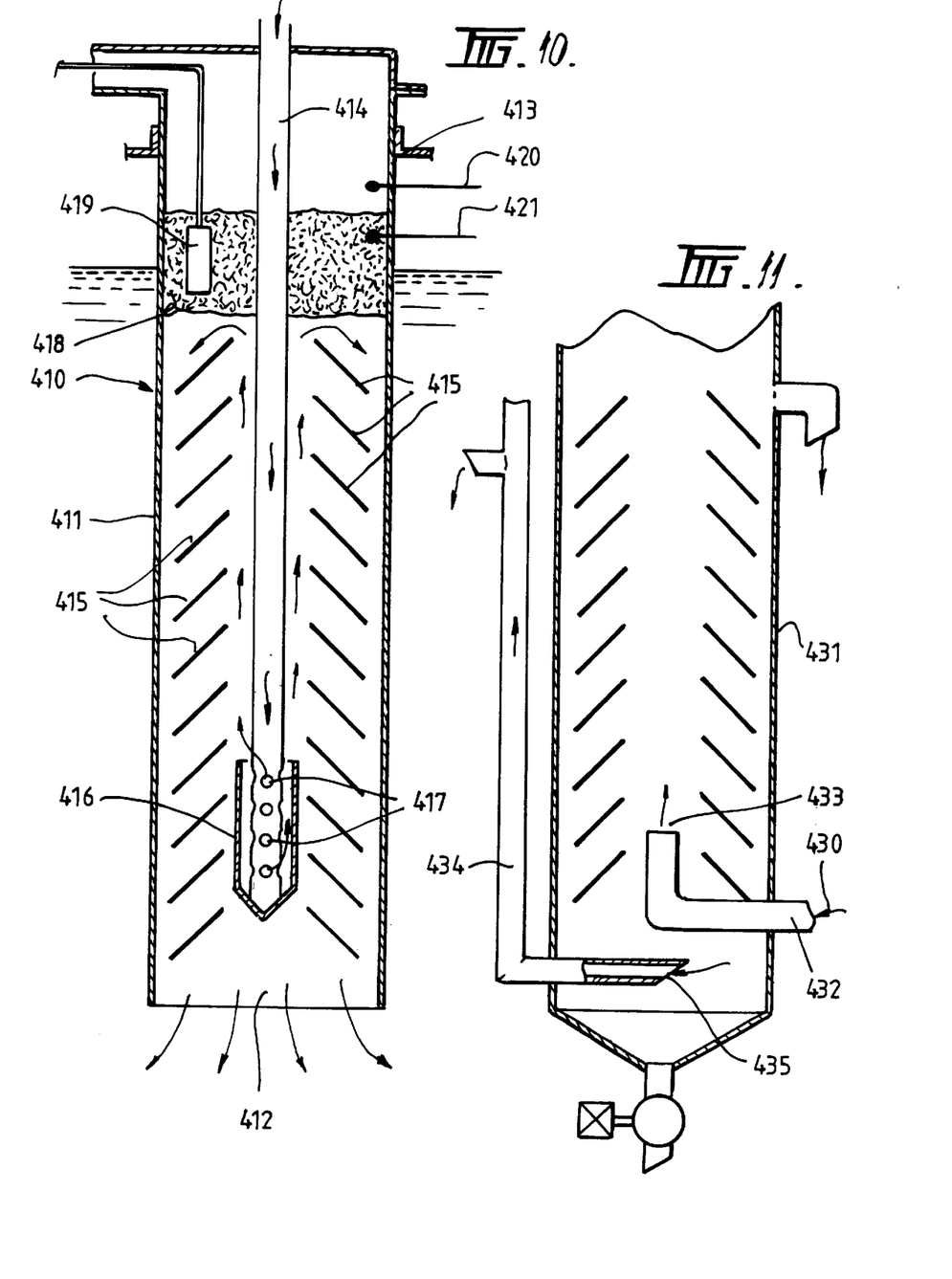
FIG. 10 is a schematic diagram of an embodiment of a separator in accordance with the present invention as applied to a skimmer pile on an off-shore oil platform.
FIG. 11 is a schematic diagram of an alternate inlet structure to the separator of the present invention as applied to a skimmer pile.

FIG. 10 represents a particular application of the present invention to the retrofitting of an existing skimmer pile of an off-shore oil rig. In this particular example 410 the vessel wall 411 is merely the existing structure of the skimmer pile and is supported by the existing platform structure 413. The bottom 412 of the vessel 411 is open. Contaminated water is introduced from the top through a centrally located vertical conduit 414. The conduit 414 is surrounded by the baffle 415. The baffle 415 may be any one of the baffle designs referred to in this disclosure and are merely shown symbolically in FIG. 10. At or near the bottom most baffle, the conduit 414 terminates in a direction reversing cup 416 allowing egress of the air/water mixture into the separator. Flow through the conduit 414 exists, for example, through the lower openings 417 and begin an ascent toward the surface in the space or chimney which is formed within the interior diameter of the baffle or individual units 415. Separated oil forms a layer 418 and is removed by a pump 419. The pump is activated by a high level start sensor and switch 420 and is deactivated by a low level stop switch 421.

As has been previously mentioned, it is believed that a convection current forms within the separator vessel. This convection current is enhanced when there is a component of flow which originates from the bottom of the vessel. This is done as shown in FIGS. 10 and 3 with a vertically descending conduit terminating in a direction reversing cup. In the alternative, and as shown in FIG. 11, the initial flow of contaminated water 430 may be introduced directly into the bottom of the vessel 431 by a conduit 432 which enters the vessel laterally and bends so that it dispenses through an upward facing opening 433. As shown here in FIG. 11 and as suggested in FIG. 3, the clean water exit conduit 434 may in any embodiment incorporate an enlarged opening 435. In this example, the opening is enlarged by cutting the conduit 434 on a bias or angle. the enlargement of the opening promotes low velocity, low turbulence ingress into the clean water drain or conduit 434.

Figure 15:
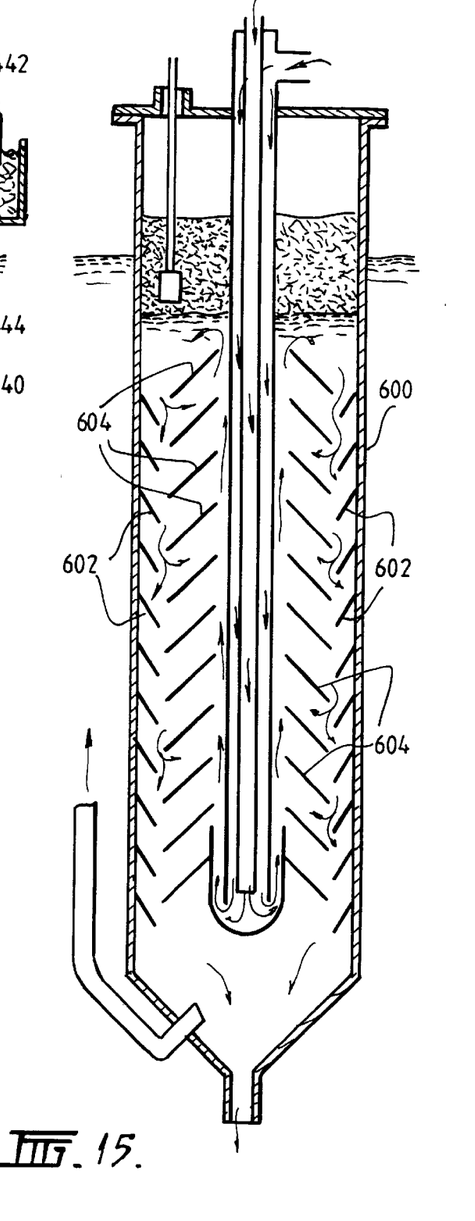
FIG. 15 is a schematic diagram of a further embodiment of the use of the apparatus of the present invention in a skimmer pile of an off-shore installation.

A further alternative of the skimmer pile separator is shown in FIG. 15 where deflectors 602 are located at spaced apart locations around the interior of the side wall of the separator 600 to co-operate with baffles 604 to induce turbulence and convection currents to assist in separating fine particle size solids from the oil/water mixture or oil from water in off-shore applications. Operation of this embodiment is the same as for the previous embodiments.

Figure 12:
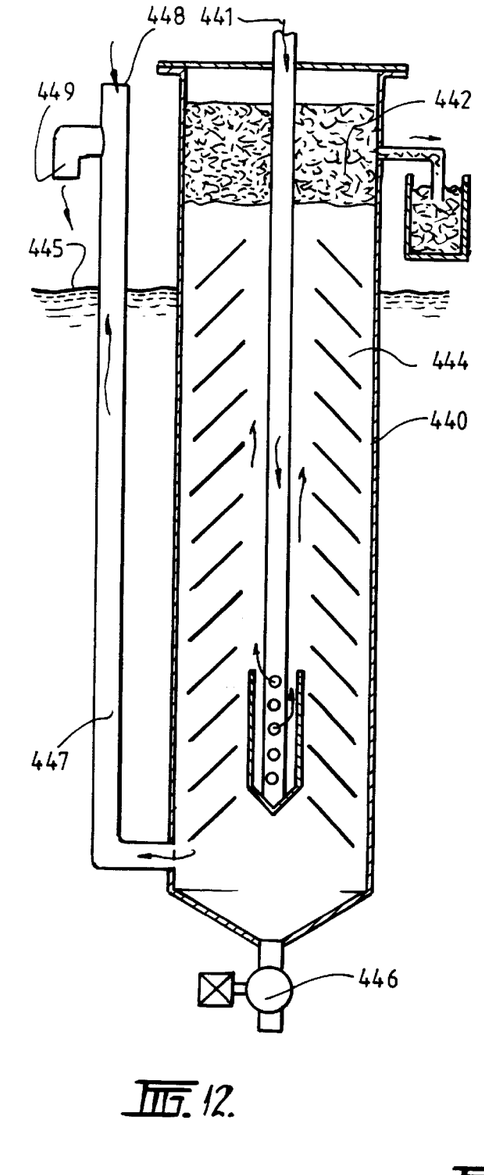
FIG. 12 is a schematic diagram of an embodiment of a separator as applied to a flooded skimmer pile.

Another embodiment of the invention is depicted in FIG. 12. In this example, the interior of the vessel is pressurised or flooded by the incoming contaminated water flow 441 so that the interface 443 between the separated oil 442 and the remainder of the contents 444 is above the level of the sea 445. In this example, a remotely controlled valve 446 has been provided. The valve is operated to allow for solids to be discharged. The addition of a clean water discharge conduit 447 with a siphon break opening at the top 48 allows the separated water at the discharge 449 to be sampled, if required.

Figure 13:
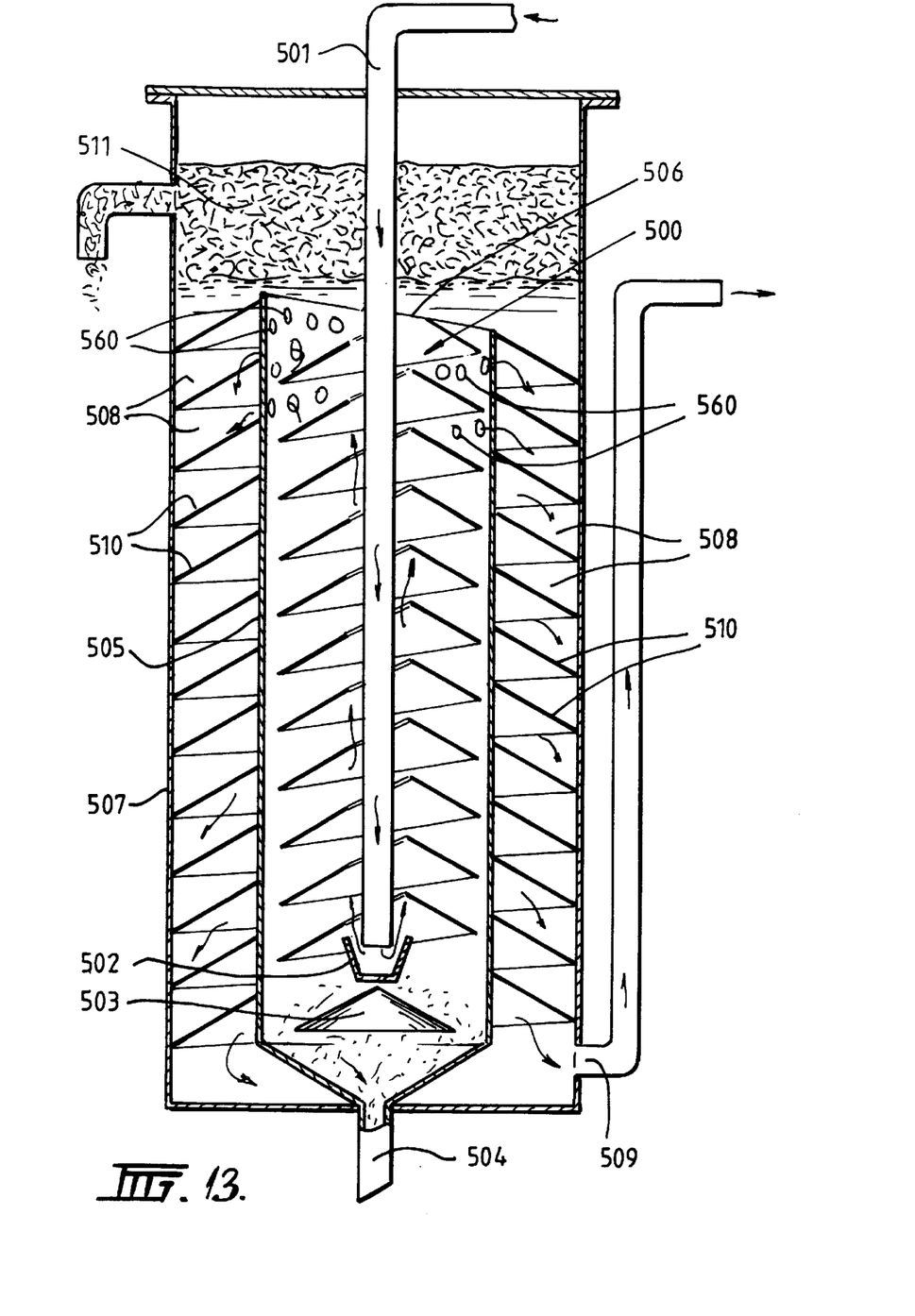
FIG. 13 is a schematic diagram illustrating an alternate embodiment of a separator incorporating a downward spiral path for the exit flow.

Another embodiment of the invention is depicted in FIG. 13. In this example, a baffle structure 500 is located about a centrally located vertical conduit 501. The conduit 501 delivers the unseparated mixture to the direction reversing cup 502 located toward or at the bottom of the baffle 500. It will be understood that any of the baffles referred to or suggested by this disclosure may be suitable. A protective cover 503 in the form of an inverted cone is located below the cup 502 and above the bottom opening 504, the cover stopping excessive turbulence and remixing of the debris with the fluid from which the debris has been separated. The baffle 500 and vertical conduit 501 are preferably located within a cylindrical inner enclosure 505. The inner vessel or enclosure 505 is open at the top 506 and is located within an exterior vessel 507. The inner vessel 505 is perforated 560 near the top to allow fluid to flow into the spiral course 508. The perforations extend down to two or three revolutions of the spiral course. Between the inner enclosure 505 and exterior vessel 507 there is located a spiral course 508 which leads to a separated or clean water discharge 509. Preferably, the spiral course 508 is formed so that the partitions 510 are inclined. The partitions 510 are inclined so that the lighter oil particles, droplets or globules are directed radially inwardly. This creates a countercurrent of lighter phase materials which tends to rise toward the oil layer 511 while still within the spiral course 508. The spiral course 508 increases the residency time of an individual oil particle within the system and thus contributes to the effectiveness of the device. In the particular example depicted in FIG. 13, the partitions 510 extend from the inner vessel 505 to the outer vessel 507.

Other modifications of the present invention include the following.

The baffle units, irrespective of what form they take, may be made from a number of different materials in a number of different ways. One way is to have a rigid material which is formed, moulded or otherwise shaped. Another way is to have a semi-rigid material which is flexible or resilient so that as the amount of separated oil or solid, depending on the configuration or orientation in which the baffle is used, can be collected and removed from the surface of the baffle by the wall of the baffle deforming, collapsing or otherwise moving to allow the collected material to fall under gravity to the base of the separator, after which the wall returns to its former shape due to the resilience or flexibility of the material from which the baffle is made.

A still further embodiment is to provide a frame upon which a membrane or similar is located to form the baffle. In this embodiment the wall material may be a film or sheet-like material which is heat sealed to the frame. In this embodiment the material forming the baffle surface may be very thin.

In another embodiment of the present invention the separator may be used to separate solids from water or water/oil mixtures or oleophilic liquids having a density or specific gravity greater than that of water from water. In these embodiments the baffle units are oriented so that the apex of the conical baffle units face towards the base of the separator and the walls of the units slope downwards, thus allowing the heavier fraction being separated to fall under gravity towards the base of the separator. In this embodiment the mixture to be separated is admitted from towards the top of the separator so that convection flow is down through the central part of the conical baffles and up along the internal walls of the separator.

It has been observed that the baffle probably works, at least in part, by assisting in the establishment of a recirculating convention current in the vessel in which the baffle is contained. With this in mind it will be appreciated that the effect of the baffle on the flow within the vessel approaches radial symmetry. For this reason the central opening provided in each baffle unit and the peripheral gaps between adjacent baffles are important. The baffles disclosed herein are all considered radially symmetrical overall, whether the individual units are truncated cones or helical, or whether they are oriented upwards or downwards.

The convection flow is assisted by introducing the unseparated liquid either toward the bottom of the vessel which contains the baffle or at the top of the vessel. However this important feature is not considered essential, as unseparated liquid may be introduced from the top, so long as the convection flow is maintained in the vessel in another way, such as by allowing movement of the water in an opposite direction.

The aforementioned examples have been designed primarily to operate at ambient conditions, however it will be appreciated that the efficiency in most applications will increase to some extent with a rise in operating temperature. The devices of the present invention are therefore suitable for combining with any form of heating, whether active or passive. In particular, the devices of the present invention could be fabricated from heat resistant materials such as stainless steel and used at elevated temperatures, for example in the food preparation industry, to remove oils or waxes which would otherwise be solid or semi-solid at ambient temperatures.

While the present invention has been described with reference to particular details of construction, these should be understood as having been provided by way of example and not as limitation as to the scope or spirit of the invention. In particular, the design details and method of assembling baffles previously provided provides merely an example of one of a wide class of baffle structures. This class of baffle structures should be seen as incorporating a wide variety of baffle materials and construction techniques. In particular, while advantageous embodiments have been disclosed the cone angle, flange width, step spacing, post spacing and baffle dimensions are not considered to be limitations on the scope of the aforementioned class.

I claim:

1. A separation apparatus for substantially separating at least two at least partially immiscible liquids, said apparatus comprising a main body portion having a wall, an inlet means for admitting a mixture of the at least two at least partially immiscible liquids, a separating means for at least partially separating the mixture admitted to the apparatus into at least a first liquid component and a second liquid component, said separating means being spaced apart from the internal surface of the wall of the apparatus, and at least two outlets, wherein one of the outlets is for discharging the first liquid component of separated material and the second outlet is for discharging the second liquid component of separated material, wherein the separating means includes a baffle arrangement having at least two baffles which are spaced apart from each other over at least a part of the respective surfaces of the baffles so that the mixture to be separated can flow intermediate the surfaces in use, each of the baffles being provided with an aperture located at or towards the center of the baffle and with a peripheral edge portion, wherein the peripheral edge portion of at least one baffle is provided with a discontinuity, the baffle arrangement being arranged so that the peripheral edge portions are spaced apart from the wall of the apparatus, and wherein the baffle arrangement defines a tortuous flow path from the inlet to the outlets along which the mixture to be separated is caused to flow for a time sufficient to allow the mixture to at least partially separate into the at least two liquid components, wherein the flow includes convection current flow within and around the baffle arrangement to facilitate separation of the mixture into the two liquid components, thereby separating the first liquid component from the second liquid component.

2. A separation apparatus according to claim 1 in which the peripheral edge portion of the battle is a flange.

3. A separation apparatus according to claim 2 in which the flange is provided with the discontinuity in the form of a cut-out, aperture, port, slot or section from which the material of the flange has been removed.

4. A separation apparatus according to claim 3 in which the discontinuity is an arcuate relief portion.

5. A separation apparatus according to claim 3 in which the position of the discontinuities of adjacent baffles in the baffle arrangement are staggered or are offset with respect to each other to define a tortuous or stepped flow path for the flow passing through the baffle arrangement.

6. A separation apparatus according to claim 5 in which the discontinuities are staggered radially around the baffle, or circumferentially around the baffle or by combination thereof.

7. A separation apparatus according to claim 3 in which the discontinuities of respective baffles are arranged in a regular, repeating pattern over at least a major number of the individual baffles forming the baffle arrangement.

8. A separation apparatus according to claim 7 in which there is stepped flow between adjacent baffles in accordance with flow through the regular repeating pattern of discontinuities.

9. A separation apparatus according to claim 8 in which the baffles are substantially conical or frustoconical in shape and are arranged in stacked spaced apart relationship to each other.

10. A separation apparatus according to claim 9 in which the side surfaces of the baffles are smooth.

11. A separation apparatus according to claim 9 in which the baffle surface is provided with surface irregularities or riffles such as projections, ribs, ridges, indentations, cavities or other means assisting in separation the liquid components from each other.

12. A separation apparatus according to claim 8 in which the baffles are rigid, or semi-rigid, or flexible.

13. A separation apparatus according to claim 1 in which one of the liquids of the mixture to be separated is water and the other of the liquids of the mixture to be separated is an oil material.

14. An apparatus according to claim 13 in which the liquid oil component has a tendency to adhere to the surfaces of the baffles whilst the water component flows substantially in the correction current flow.

15. A separation apparatus according to claim 1 in which the two outlets of the apparatus form a manometer or a substantially U-shaped trap between the two outlets, so that the outlet for discharging the liquid component having a lower specific gravity or density is located above the level of the outlet for discharging the liquid component having the higher specific gravity or density.

16. An apparatus according to claim 1 further comprising a hollow tube, optionally provided with apertures, located along the central axis of the apparatus, wherein the baffles are arranged around the central tube in such a manner that the flow path of the liquid mixture being separated is through the centrally located portion of the baffle in the vicinity of the central tube.

17. A separation apparatus according to claim 1 in which the baffle is conical or frusto-conical having a sloping side and is made from a flexible or resilient material which is free to deform or collapse under the weight of material collected on the sloping surface of the baffle, and the baffle is self-cleaning by being arranged to allow material collected on the surface of the baffle to slide off the sloping surface of the baffle, where after the baffle is restored to its original shape.

18. A separation apparatus according to claim 17 in which the peripheral edge portion of the baffle is a flange arranged at an angle to the sloping side of the baffle at an angle of from 45°–135°.

19. A separation apparatus according to claim 18 in which the surface of the baffle is substantially linear or is substantially curved.

20. A separation apparatus according to claim 1 further comprising a direction reversing cup associated with the inlet for admitting the mixture to the separating apparatus in order to direct the flow of the mixture to be separated in the desired direction in order to facilitate separation of the mixture into the two liquid components.

21. A separation apparatus according to claim 1 in which the interior wall of the apparatus is provided with deflectors, wherein said deflectors are spaced apart from each other and from the peripheral edges of the baffles to further define the tortuous flow path of the convection current flow through the apparatus.

22. A method of substantially separating a mixture of at least two at least partially immiscible liquids into at least a first liquid component and a second liquid component using a tortuous flow path including convection current flow within a separation apparatus having a wall, comprising the steps of admitting the mixture to the separation apparatus through an inlet means, allowing the mixture to flow along a tortuous flow path in convection current flow for a time sufficient to at least partially separate the mixture into the first and second liquid components, and discharging the first liquid component when separated from the mixture through a first outlet means and discharging the second liquid component when separated from the mixture through a second outlet means, wherein the separating means includes a baffle arrangement having at least two baffles which are spaced apart from each other over at least a part of the respective surfaces of the baffles so that the mixture to be separated can flow intermediate the surfaces in use, each of the baffles being provided with an aperture located at or towards the center of the baffle and with a peripheral edge portion, wherein the peripheral edge portion of at least one baffle is provided with a discontinuity, the baffle arrangement being arranged so that the peripheral edge portions are spaced apart from an internal surface of the wall of the separation apparatus, wherein the baffle arrangement defines a tortuous flow path from the inlet to the outlets along which the mixture to be separated is caused to flow for a time sufficient to allow the mixture to at least partially separate into the at least two liquid components, wherein the flow includes convection current flow within and around the baffle arrangement in order to separate the mixture into the two liquid components, thereby separating the first liquid component from the second liquid component.

23. A method according to claim 22 in which one of the liquids of the mixture to be separated is water and the other of the liquids of the mixture to be separated is an oil material.

24. A method according to claim 23 in which the convection current flow is stepped flow through the discontinuities of the baffles.

25. A method according to claim 23 in which the convection current flow is through the centrally located apertures of the baffles forming the baffle arrangement.

26. A method according to claim 25 in which the baffles are substantially conical or frusto-conical in shape with the central aperture of each baffle located at or towards the apex of the baffle.

27. A method according to claim 26 in which the convection current flow is set up in which the direction of flow is in the direction from the base of the baffle to the apex of the baffle for flow within the baffle and is counter current flow in the space between the flange of the baffle and the wall of the apparatus.

28. A method according to claim 23 in which the flow path of the mixture to be separated is in the direction extending from the base of the baffles, up through the centrally located apertures of the baffles, towards and over the top of the baffle arrangement and down the side of the baffle arrangement in the space between the flanges of the baffles and the wall of the apparatus, wherein the liquid component containing the oil has a tendency to flow in the space between adjacent baffles to facilitate separation of the oil from the water.

29. A method according to claim 28 in which the liquid component containing the oil is recycled through the baffle arrangement so that the oil-containing liquid component flows repeatedly through the baffle arrangement in the space between adjacent baffles.

* * * * *